(12) United States Patent
Alsafadi et al.

(10) Patent No.: US 7,124,356 B1
(45) Date of Patent: Oct. 17, 2006

(54) METHODS FOR INITIATING ACTIVITY IN INTELLIGENT DEVICES CONNECTED TO AN IN HOME DIGITAL NETWORK USING EXTENSIBLE MARKUP LANGUAGE (XML) FOR INFORMATION EXCHANGE AND SYSTEMS THEREFOR

(75) Inventors: Yasser Alsafadi, Yorktown Heights, NY (US); Aninda Dasgupta, Croton-On-Hudson, NY (US); Raymond Krasinski, Suffern, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/454,348

(22) Filed: Dec. 3, 1999

(51) Int. Cl.
*G06F 17/00* (2006.01)

(52) U.S. Cl. ..................... 715/513; 707/100
(58) Field of Classification Search ............. 715/513, 715/514, 515; 709/203; 707/100, 101, 102
See application file for complete search history.

(56) References Cited

U.S. PATENT DOCUMENTS 5,889,950 A    3/1999  Kuzma .................. 395/200.48
6,125,391 A *  9/2000  Meltzer et al. ............. 709/223

(Continued)

FOREIGN PATENT DOCUMENTS

WO       WO9957837       11/1999

(Continued)

OTHER PUBLICATIONS

"Spyglass—HTML Validator", 1996, Spyglass, Inc., Version 1.0, pp. 1-7.*

(Continued)

*Primary Examiner*—Sanjiv Shah

(57) ABSTRACT

A method of operating a system including a digital network interconnected intelligent digital devices (IDDS) generating and receiving eXtensible Markup Language (XML) documents containing data and respective Document Type Definitions (DTDs) describing the data content. Preferably, the method includes steps for transmitting a generated XML document from a first IDD to a second IDD, and, when the respective DTD for the generated XML document satisfies a predetermined criteria, operating on the data contained in the XML document at the second IDD. In a first exemplary case, the second IDD maintains a list of trusted DTDs, and the predetermined criteria is equality between the name of the respective DTD and the name of a trusted DTD. Alternatively, the predetermined criteria is satisfied by inclusion of the name of a program residing on the second IDD in the respective DTD. In a second exemplary case, the transmitting step includes transmitting the generated XML document from the first IDD to the second IDD and a third IDD, the operating step includes operating on the data contained in the XML document at the second IDD when the respective DTD for the generated XML document satisfies a first predetermined criteria, and the method further includes the step of operating on the data contained in the XML document at the third IDD when the respective DTD for the generated XML document satisfies a second predetermined criteria. A system composed of IDDs interconnected by an in home digital network (IHDN) or other mechanism, which system can be operated by the method mentioned above, is also described.

26 Claims, 9 Drawing Sheets

U.S. PATENT DOCUMENTS

| | | | |
|---|---|---|---|
| 6,167,448 A * | 12/2000 | Hemphill et al. | 709/224 |
| 6,226,675 B1 * | 5/2001 | Meltzer et al. | 709/223 |
| 6,401,132 B1 * | 6/2002 | Bellwood et al. | 709/246 |
| 6,466,971 B1 * | 10/2002 | Humpleman et al. | 709/220 |
| 6,480,860 B1 * | 11/2002 | Monday | 707/102 |
| 6,502,112 B1 * | 12/2002 | Baisley | 715/513 |
| 6,507,856 B1 * | 1/2003 | Chen et al. | 715/513 |
| 6,519,597 B1 * | 2/2003 | Cheng et al. | 707/10 |
| 6,636,845 B1 * | 10/2003 | Chau et al. | 707/1 |
| 6,675,219 B1 * | 1/2004 | Leppinen et al. | 709/230 |

FOREIGN PATENT DOCUMENTS

WO    WO 200023925 A2 *    4/2000

OTHER PUBLICATIONS

Miltimedia home platform, the Internet and the World Wide Web (Gillich S.) (Fernseh -und Kino-Technik, vol. 53, No. 1-2, pp. 27-31, Jan.-Feb. 1999; Abstract.

User Interface Technologies for Home Appliances and Networks (Corcoran PM; Papal F; Zoldi A) (IEEE Trans. On Consumer Electronics, vol. 44, No. 3, pp. 679-685, Aug. 1998) (Abstract).

"A Gentle Introduction to SGML", Text Encoding Initiative, http//www-ei.uic.edu/orgs/tei/sgml/teip3sg/index.html; p. 1, Dec. 1999.

Jon Bosak entitled "XML, Java, and the Future of the Web", Sun Microsystems at http://metalab.unc,edu/pub/sun-fo/standards/xml/why/xmlapps.htm, pp. 1-9, Mar. 1997.

M. Bryan entitled "An Introduction to the Extensible Markup Language (XML)", The SGML Centre, at http//www.personal.u-net.com/- sgml/xmlintro.htm; pp. 1-6, 1997.

* cited by examiner

| LUT 128 | | |
|---|---|---|
| TRUSTED DTD #1 | XML APP #1 | XML APP #1 STORAGE LOCATION |
| TRUSTED DTD #2 | XML APP #2 | XML APP #2 STORAGE LOCATION |
| TRUSTED DTD #3 | XML APP #3 | XML APP #3 STORAGE LOCATION |

FIG. 2A

| LUT 128 | | | |
|---|---|---|---|
| TRUSTED DTD #1 | DTD #1 STORAGE LOCATION | XML APP #1 | XML APP #1 STORAGE LOCATION |
| TRUSTED DTD #2 | DTD #2 STORAGE LOCATION | XML APP #2 | XML APP #2 STORAGE LOCATION |
| TRUSTED DTD #3 | DTD #3 STORAGE LOCATION | XML APP #3 | XML APP #3 STORAGE LOCATION |

```xml
<?xml version="1.0"?>
<!DOCTYPE guide SYSTEM "VRML.DTD">

<EPG>
    <Date>06-04-1998</Date>
    <TimeBlock Block="6pm-midnight">
    <channel>
    <definition><number>2</number><name>CBS</name>
        <channel-type>Network<channel-type></definition>
        <Entry>
            <Time-slot>
                <start-time>18:00</start-time>
                <end-time>20:00</end-time>
            </Time-slot>
            <Program>
                <movie>
                    <title>Miller's Crossing</title>
                    <description>A noir gangster movie that examines a conflict
                    between the Irish and Italian mafia in a small city in 1920s
                    America. This interesting, but very violent tale follows a
                    top member of the Irish gang as he switches sides and
                    explores a web of deceit and double-crosses between members
                    of the two gangs, the corrupt local government and other
                    shady characters.</description>
                    <program-type>Drama</program-type>
                    <program-subtype>Gangster</program-subtype>
                    <running-time>2:00</running-time>
                    <review-rating>***</review-rating>
                    <language>English</language>
                    <release-year>1991</release-year>
                    <players>
                        <director>Joel Coen</director>
                        <producer>Ethan Coen</producer>
                        <actor>John Tuturro</actor></players>
                </movie>
                <parental-rating>TVMA</parental-rating>
            </Program>
        </Entry>
    </channel>
</TimeBlock>

</EPG>
```

```
<!-- DTD for a Simple TV Guide Application    R. Krasinski    1998.06.04 -->
<!ELEMENT TVGuide - - (Date, TimeBlock+)>
<!ELEMENT Date - - (#PCDATA)>
<!ELEMENT TimeBlock - - (channel)+>
<!ATTLIST Block CDATA    #REQUIRED >
<!ELEMENT channel - - (definition, Entry+)+>
<!ELEMENT definition - - (number, name, channel-type)>
<!ELEMENT Entry - - (Time-slot, program)+>
<!ELEMENT Time-slot - - (start-time, end-time)>
<!ELEMENT program - - ((movie | series-episode | sport | talk | news | cartoon), parental-rating)>
<!ELEMENT movie - - (title, description, program-type, program-subtype, running-time, review-rating,
language, release-year, MPAA-rating, players)>
<!ELEMENT players - - (director, producer, actor*)>
<!ELEMENT actor - - (guild-name, award)>
<!ELEMENT producer - - (person-name, award)>
<!ELEMENT director - - (guild-name, award)>
<!ELEMENT parental-rating - - (#PCDATA)>
<!ELEMENT number - - (#PCDATA)>
<!ELEMENT name - - (#PCDATA)>
<!ELEMENT channel-type - - (#PCDATA)>
<!ELEMENT start-time - - (#PCDATA)>
<!ELEMENT end-time - - (#PCDATA)>
<!ELEMENT title - - (#PCDATA)>
<!ELEMENT description - - (#PCDATA)>
<!ELEMENT program-type - - (#PCDATA)>
<!ELEMENT program-subtype - - (#PCDATA)>
<!ELEMENT running-time - - (#PCDATA)>
<!ELEMENT review-rating - - (#PCDATA)>
<!ELEMENT language - - (#PCDATA)>
<!ELEMENT release-year - - (#PCDATA)>
<!ELEMENT MPAA-rating - - (#PCDATA)>
<!ELEMENT guild-name - - (#PCDATA)>
<!ELEMENT person-name - - (#PCDATA)>
<!ELEMENT award - - (#PCDATA)>
```

FIG. 5

```
<!-- DTD for a Simple TV Guide Application    R. Krasinski    1998.06.04 -->
<!ELEMENT TVGuide - - (Date, TimeBlock+)>
<!ELEMENT Date - - (#PCDATA)>
<!ELEMENT TimeBlock - - (channel)+>
<!ATTLIST Block CDATA    #REQUIRED >
<!ELEMENT channel - - (definition, Entry+)+>
<!ELEMENT definition - - (number, name, channel-type)>
<!ELEMENT Entry - - (Time-slot, program)+>
<!ELEMENT Time-slot - - (start-time, end-time)>
<!ELEMENT program - - ((movie | series-episode | sport | talk | news | cartoon), parental-rating))>
<!ELEMENT movie - - (title, description, program-type, program-subtype, running-time, review-rating,
language, release-year, MPAA-rating, players)>

<!ELEMENT players - - (director, producer, actor*)>
<!ELEMENT actor - - (guild-name, award)>
<!ELEMENT producer - - (person-name, award)>
<!ELEMENT director - - (guild-name, award)>
<!ELEMENT parental-rating - - (#PCDATA)>
<!ELEMENT number - - (#PCDATA)>
<!ELEMENT name - - (#PCDATA)>
<!ELEMENT channel-type - - (#PCDATA)>
<!ELEMENT start-time - - (#PCDATA)>
<!ELEMENT end-time - - (#PCDATA)>
<!ELEMENT title - - (#PCDATA)>
<!ELEMENT description - - (#PCDATA)>
<!ELEMENT program-type- - (#PCDATA)>
<!ELEMENT program-subtype - - (#PCDATA)>
<!ELEMENT running-time - - (#PCDATA)>
<!ELEMENT review-rating - - (#PCDATA)>
<!ELEMENT language - - (#PCDATA)>
<!ELEMENT release-year - - (#PCDATA)>
<!ELEMENT MPAA-rating - - (#PCDATA)>
<!ELEMENT guild-name - - (#PCDATA)>
<!ELEMENT person-name - - (#PCDATA)>
<!ELEMENT award - - (#PCDATA)>
```

FIG. 8

METHODS FOR INITIATING ACTIVITY IN INTELLIGENT DEVICES CONNECTED TO AN IN HOME DIGITAL NETWORK USING EXTENSIBLE MARKUP LANGUAGE (XML) FOR INFORMATION EXCHANGE AND SYSTEMS THEREFOR

BACKGROUND OF THE INVENTION

The present invention relates generally to data communications between intelligent information and entertainment digital devices (IDDs) forming an in home digital network (IHDN). More particularly, the present invention relates to a novel way to use eXtensible Markup Language (XML) as a mechanism to initiate action in one or more of the IDDs connected to an IHDN to facilitate interoperability and integration thereof.

A myriad of different intelligent digital devices (IDDs) for providing information and entertainment to the user have come into widespread use. These devices include, but are not limited to, conventional (analog) televisions (TVs) and digital TVs (DTVs), such as high definition televisions (HDTVs), Direct Broadcast Satellite (DBS) receivers, cable/terrestrial/satellite set-top boxes (STBs), conventional VCRs, digital video recorders (DVRs), telephones, stereo systems, personal computers (PCs), cellular phones, DVD players, CD-I players, video game consoles, e.g., the recently introduced Sega Dreamcast system, Personal Digital Assistants (PDAs), intelligent Remote Control Devices (RCDs), video cameras, digital cameras, etc. All of the above-mentioned IDDs incorporate one of a Digital Signal Processor (DSP), microcontroller, microprocessor, system-on-a-chip (SOC), Programmable Logic Device (PLD), Programmable Logic Array (PLA), or other digital data processing means.

The rank and file of the computer electronics industry in general and the software industry in particular have been searching for the next "killer" applications, i.e., an application that could drive the sale of hardware just like the Visicalc program drove the sale of the Apple computer. This killer application, as envisioned by many manufacturers, is a single application with a set of features that a consumer would buy for a premium price. A single new device may not be this killer application. What may be the application that builds customer loyalty and enables widening of profit margins is the ability of a suite of devices to work together to address the needs of the household as no single device can. This inter-operability of devices can increase the value and functionality of the collection of devices in the home and can allow these devices, in concert, to provide services that no single device can adequately provide. Thus, one possible advance akin to a "killer" application is a consumer friendly software set that could be shared by, or distributed among, multiple devices, the ultimate goal being to enable the different intelligent devices to work together in a cooperative and integrated fashion, i.e., as if the entire collection of such devices were a single, distributed, multi-function device. The holy grail of the "home electronics" industry is a mechanism that would allow diverse IDDs to exchange data and act on the exchanged data in a seamless and transparent manner. Thus, two elements needed to implement this "killer" application are a network to connect the IDDs and software permitting the IDDs to act on shared information.

With respect to the first requirement, one way to enable this interconnectivity of consumer devices is to have a communications backbone present in the home. It will be appreciated that this backbone, or network, would allow any capable consumer device to communicate with any other device attached to the network. Many consumers are already beginning to install PC networks in their homes to share, for example, a cable modem or digital subscribed line (DSL) fast internet connection. Moreover, in home digital networks (IHDNs) have been proposed to interconnect a multiplicity of IDDs. The devices connected to such an IHDN can communicate with another over any suitable communications medium, e.g., via an IEEE 1394 serial communications bus, also known as "Fire Wire", or via a wireless communications medium. The IHDN would solve many existing problems of combining devices. Connecting a television, a VCR, a satellite dish, a PC, a stereo and six speakers would no longer require dozens of cables, multiple splitters purchased at an electronics store, and a degree in electrical engineering. All that would be required is connecting each of these devices to the IHDN and turning it on. However, these connected IDDs could still not operate in concert.

What is needed is a method and corresponding system permitting the exchange of information between IDDs. Preferably, what is needed is a method and corresponding system permitting the exchange of information to initiate an operation responsive to receipt of the exchanged information by one of the devices on a network. It would be beneficial if the method and corresponding system could operate on a plurality of the exchanged information. What is also needed is a method to facilitate data exchanges between incompatible intelligent digital devices connected to one another via an IHDN.

SUMMARY OF THE INVENTION

Based on the above and foregoing, it can be appreciated that there presently exists a need in the art for a method and corresponding system which increases the interoperability of intelligent digital devices connect via an in home digital network. The present invention was motivated by a desire to overcome the drawbacks and shortcomings of the presently available technology, and thereby fulfill this need in the art.

In one aspect, the present invention provides a method of operating an intelligent digital device (IDD) receiving an eXtensible Markup Language (XML) document containing data and respective Document Type Definition (DTD) describing the data content. Preferably, the method includes steps for verifying that a received DTD satisfies a predetermined criteria, and operating on the data contained in the XML document. In an exemplary case, the IDD maintains a list of trusted DTDs and the predetermined criteria is equality between the name of the received DTD and the name of a trusted DTD. Alternatively, the predetermined criteria comprises the inclusion of the name of a program residing on the IDD.

In another aspect, the present invention provides a method of operating a system including a digital network interconnected intelligent digital devices (IDDs) generating and receiving eXtensible Markup Language (XML) documents containing data and respective Document Type Definitions (DTDS) describing the data content. Preferably, the method includes steps for transmitting a generated XML document from a first IDD to a second IDD, and, when the respective DTD for the generated XML document satisfies a predetermined criteria, operating on the data contained in the XML document at the second IDD. In a first exemplary case, the second IDD maintains a list of trusted DTDs, and the predetermined criteria is equality between the name of the respective DTD and the name of a trusted DTD. Alternatively, the predetermined criteria comprises the inclusion of the name of a program residing on the second IDD. In a second exemplary case, the transmitting step includes transmitting the generated XML document from the first IDD to the second IDD and a third IDD, the operating step includes operating on the data contained in the XML document at the second IDD when the respective DTD for the generated XML document satisfies a first predetermined criteria, and the method further includes the step of operating on the data contained in the XML document at the third IDD when the respective DTD for the generated XML document satisfies a second predetermined criteria.

In yet another aspect, the present invention provides a method of operating a system including a digital network interconnected intelligent digital devices (IDDs) generating and receiving eXtensible Markup Language (XML) documents containing data and respective Document Type Definitions (DTDs) describing the data content. Advantageously, the method includes steps for:

(a) generating an XML document containing related data and a reference to a respective DTD at a first IDD responsive to a command from a second IDD;

(b) transmitting the XML document from the first to the second IDD;

(c) when the respective DTD satisfies a predetermined criteria, parsing the data in the XML document in accordance with the format described in the respective DTD to thereby generate parsed data from the related data; and (d) operating on the parsed data.

In a still further aspect, the present invention provides a system including a plurality of intelligent digital devices (IDDs) interconnected to one another, each of the IDDs being capable of one of generating and receiving an eXtensible Markup Language (XML) document containing data and referencing a document type definition (DTD). The system is further characterized in that:

a first IDD generates the XML document responsive to a command received over the IHDN;

a second IDD stores N XML processors associated with N named DTDs;

a third IDD stores M XML processors associated with M named DTDs;

the second IDD processes the XML document using one of the N XML processors when the respective DTD corresponds to one of the N named DTDs;

the third IDD processes the XML document using one of the M XML processors when the respective DTD corresponds to one of the M named DTDs; and N and M are both positive integers.

Preferably, in the above-mentioned system, at least one of the N named DTDs and at least one of the M named DTDs are identical to the respective DTD, while the one of the N XML processors corresponding to the respective DTD is different than the one of the M XML processors corresponding to the respective DTD. In an exemplary embodiment, the second IDD stores the N named DTDs, while the third IDD stores the M named DTDs. Alternatively, the second and third IDDs store lists of trusted DTDs including the associated N and M named DTDs, and the first IDD generates the XML document and the respective DTD responsive to the command received over the IHDN. The IDD's advantageously can be interconnected via an in home digital network (IHDN).

BRIEF DESCRIPTION OF THE DRAWINGS

These and various other features and aspects of the present invention will be readily understood with reference to the following detailed description taken in conjunction with the accompanying drawings, in which like or similar numbers are used throughout, and in which:

FIGS. 2A and 2B are alternative configurations of the LUT 128 illustrated in FIG. 1;

FIG. 4 illustrates the format of an XML(EPG) document which can be transmitted over the IHDN illustrated in FIGS. 1 and 3;

FIG. 5 illustrates the format of a document type definition (DTD) associated with the XML(EPG) document illustrated in FIG. 4;

FIG. 8 shows VRML commands as generated by the parsing of the XML (EPG) document.

DETAILED DESCRIPTION OF THE PREFERRED EMBODIMENTS

Figure 1:
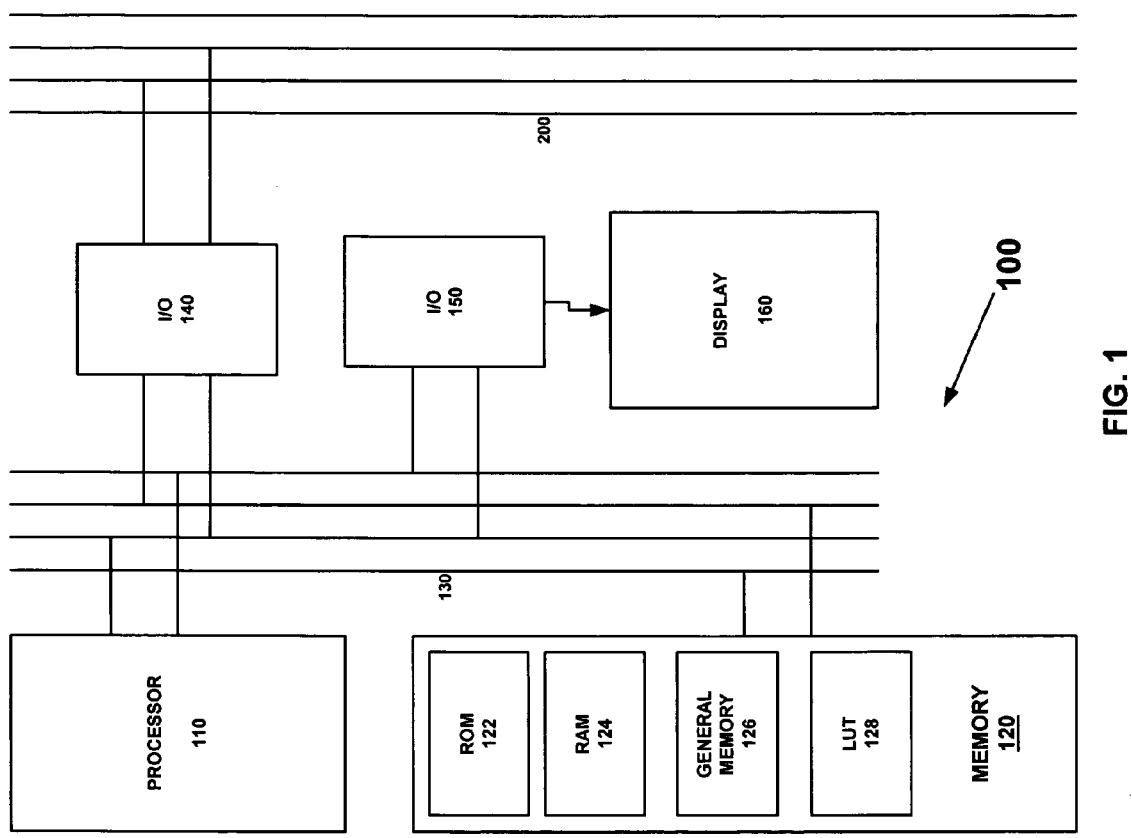
FIG. 1 is a high level block diagram of an intelligent digital device (IDD) connected to an in home digital network (IHDN)

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

As mentioned above, many manufacturers and device vendors have been searching for the next "killer" application for the modern home. One candidate is an in home digital network (IHDN), which advantageously could be used to interconnect all of the accoutrements of a modern home, e.g., DTV, DVD player, surround sound system, several PCs, etc. This integrated entertainment and information system is envisioned to include components which will exchange data, and preferably act on the exchanged data, in a manner which is completely invisible to the system user(s). However, when such a system is fabricated from current electronic components, the system still has the limitation that not every device connected to the IHDN will understand how to communicate with other devices attached to the IHDN.

In terms of the integrated entertainment and information system, once all of the devices in the home are connected together, either hardwired or by a broadcast connection, a communications standard, or common language, is still required so that all of the devices can be understood by all the other devices, i.e., so the connected devices can exchange information and cooperate. The language must be:

Flexible enough to support a wide array of devices;

Extensible, so new classes of devices can be supported;

Easily Parsed by processor and memory constrained devices; and

An open standard with broad industry backing.

The present invention solves this problem by employing a method in which XML, a language which possesses all of the qualities required in a communications standard for the IHDN, is used in a new way to solve the problem of device interconnectivity. In other words, the method and corresponding system according to the present invention overcome the above-identified problem by fabricating the system from intelligent digital devices (IDDs). In the inventive system, each of the IDDs is capable of generating and/or receiving an eXtensible Markup Language (XML) document. Moreover, IDDs capable of receiving the XML document store at least one XML application for processing the data contained in the XML document in accordance with a document type definition (DTD). These features of each IDD will be discussed in greater detail below. Before a detailed discussion of the IDD is undertaken, a brief discussion of the XML standard, which is a subset of the SGML standard, will be presented.

SGML, an acronym for Standard Generalized Markup Language, is an international standard (ISO 8879:1986) and is a markup language used extensively in publishing and other domains. Additional material on SGML is included in the document entitled "A Gentle Introduction to SGML", Text Encoding Initiative, which can be obtained from the web page [http://www-tei.uic.edu/orgs/tei/sgml/teip3sg/index.html]. Moreover, XML is a markup language based on SGML. In either case, "markup" denotes that the information is annotated (or marked up) with tags. Tags surround a section of information (called content) and define the properties of the content. A more detailed explanation is provided in the article by M. Bryan, entitled "An Introduction to the Extensible Markup Language(XML)", which is available from The SGML Centre, at [http://www.personal.u-net.com/~sgml/xmlintro.htm]; and the paper by Jon Bosak entitled "XML, Java, and the Future of the Web", which is available from Sun Microsystems at [http://metalab.unc.edu/pub/sun-info/standards/xml/why/xmlapps.htm]. It should be noted that all of the documents mentioned above are incorporated herein by reference.

The XML standard is the result of an effort by the World Wide Web Consortium (W3C) to enable the further expansion of Web technology into new domains of distributed document processing. The first officially released specification for XML from W3C was released on Feb. 10, 1998 and the specifications for required related standards are still being formulated.

XML is used to capture structured data and text. In contrast, Hypertext Markup Language (HTML), the language used to develop Web pages, is capable of capturing multimedia documents. Any inherent relationship between the information captured in an HTML document is lost. For example, text annotated in HTML could have the form <bold> text </bold>, indicating that the included text would be displayed in a bold font. In contrast, data annotated in XML would have the form <program-type> text </program-type>, indicating that the data between the tags denotes the genre of a movie in an electronic program guide (EPG)). It is important to note that in XML, these data relationships are preserved and can be used by the receiver of the XML document. It should also be mentioned that there are several related standards for XML that specify how to display and link XML documents; this suite of XML standards, used together, can capture, display and link together highly structured information in an effective way.

As mentioned immediately above, an important feature of XML is that it separates the data from how that data should be displayed. This is useful because it allows the same XML document to be used by multiple IDDs for different purposes. Since each IDD advantageously can display the data in an appropriate manner, the XML document is flexible and reusable.

It should be mentioned that the manner is which each IDD employs the XML documents it receives is determined by the Document Type Definition (DTD). The DTD defines the structure of the XML document including what each tag represents. It should also be mentioned that each IDD advantageously can have its own set of DTD(s) that is (are) applied to the XML documents that the IDD receives. Moreover, as mentioned below, the referenced DTD in an XML document advantageously can be employed to initiate operation of a specific program residing on a respective IDD on the received XML document. See FIG. 7. It will be appreciated that several IDDs can have different versions of, for example, a VRML interpreter, each version generating a VRML world, as discussed in greater detail below with respect to FIG. 6, sized to a different display device. In this way, each IDD can use the same XML document and associated DTD to produce, for example, an IDD-specific presentation. Moreover, as discussed in greater detail below, substantially identical versions of a XML document advantageously can be formatted for display and presentation, in an exemplary case, by merely editing the DTD name included in the XML document to thereby instantiate a different XML application.

The ability of the IDDs to generate, transmit, receive, and process XML documents in accordance with respective DTDs are features essential to creating a flexible and scalable IHDN. The entertainment and information system according to the present invention thus consists of a plurality of IDDs connected through a network and communicating with one another using XML documents. As discussed in greater detail below, each IDD contains an XML parser or processor that allows the IDD to read an XML document and a DTD (or set of DTDs) that allows the IDD to understand XML documents received across the network.

A high level block diagram of an exemplary IDD 100 is illustrated in FIG. 1 as including processor 110 receiving instructions from a memory 120 via a bus 130. It will be appreciated that the memory 120 advantageously can include a read-only memory (ROM) 122, a random access memory (ROM) 124, and a general purpose memory 126, which could be a hard disk drive, a CD-ROM, etc. It will also be appreciated that the bus 130 can include a number of general and special purpose buses known to one of ordinary skill in the art. The processor 110 preferably is connected to the IHDN 200 via a first input/output (I/O) device 140 and is connected to another device, e.g., a display 160, via a second I/O device 150.

Preferably, the memory 120 stores at least one XML application for generating and parsing XML documents. Advantageously, the XML application may also build or facilitate the building of XML documents and associated DTDs. In addition, the memory stores the operating program(s) of the IDD, which program(s) advantageously can include(s) a routine for instantiating the XML application when (a) an XML document has been received by the IDD 100 and (b) a predetermined condition is satisfied.

In an exemplary case, the 120 stores a look up table (LUT) 128 employing the names of trusted DTDs at pointers to respective XML applications, where trusted DTDs are DTDs that have tested satisfactory when communicating between IDD 100*a* and 100*b*, for example. It will be appreciated that trusted DTDs need not be supplied by the vendor of the specific IDD. It will also be appreciated that the memory 120 need not store the actual trusted DTD; the associated XML program can be instantiated as long as a match occurs between the DTD referenced in the XML document and the name of the trusted DTD stored in LUT 128. Alternatively, the memory 120 advantageously can store the trusted DTDs, which saves bandwidth in the IHDN 200. See FIGS. 2A and 2B.

As previously discussed, the present invention employs XML documents as a data exchange mechanism, allowing various and diverse IDDs 100 to share data between themselves over the IHDN 200. One exemplary embodiment of an entertainment and information system 1 according to the present invention is illustrated in FIGS. 3–9 with respect to conveying Electronic Program Guide (EPG) data between several IDDs over the IHDN 200.

Figure 3:
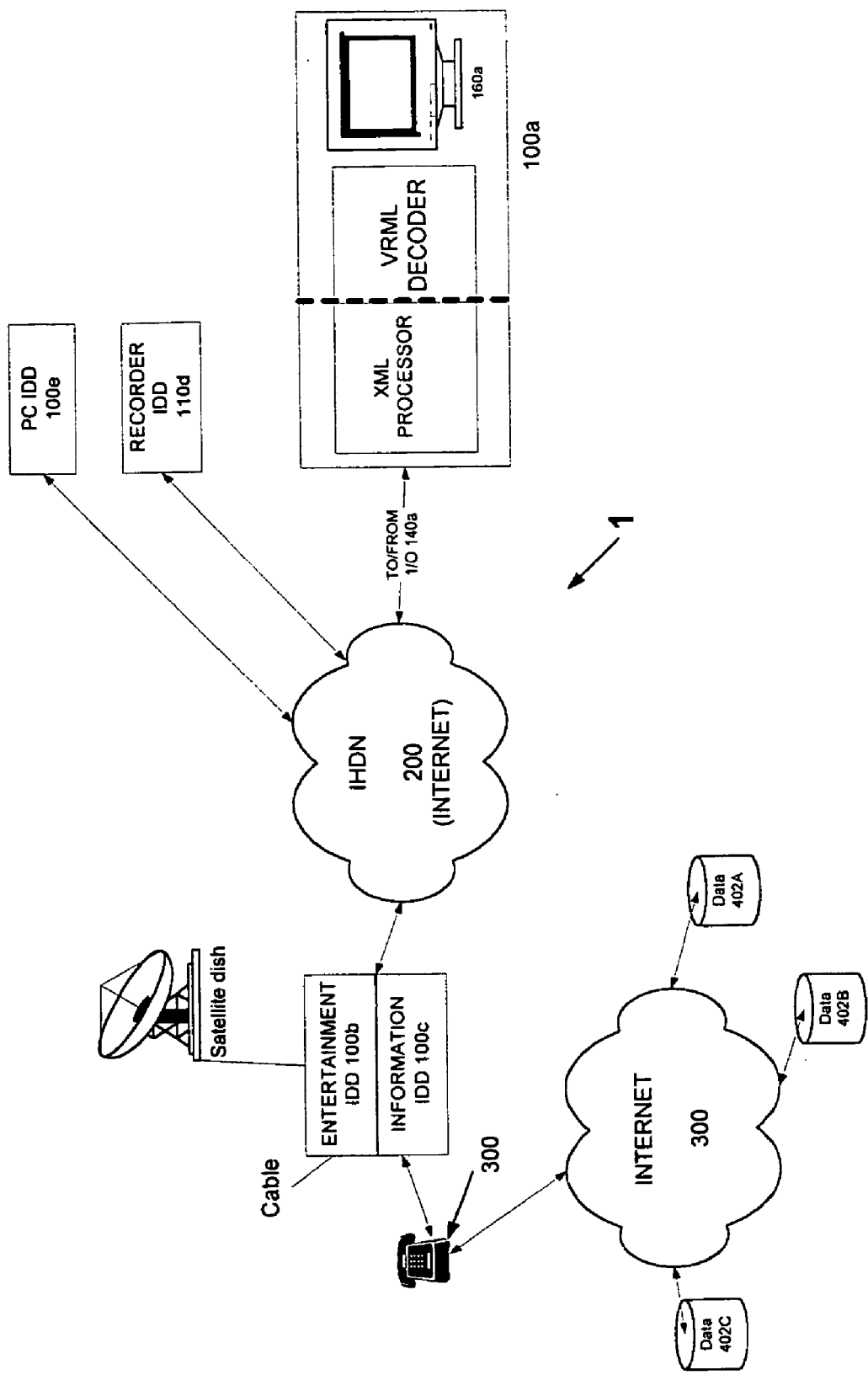
FIG. 3 is a representation of the entertainment and information system of the present invention, particularly illustrating how the invention can be used to exchange information based on electronic program guide (EPG) data.

Referring to FIG. 3, it will be appreciated that one way to conceptualize the entertainment and information system 1 is by means of the display-centric model being investigated by one of the High Volume Electronics (HVE) strategy groups working in consumer electronics product planning. In this model, a consumer buys a display IDD 100*a*, e.g., a flat panel display, an entertainment IDD 100*b*, e.g., a cable/terrestrial/satellite receiver (a.k.a. set-top-box (STB)) which performs all of the audio/video/data decoding functions, an information IDD 100*c*, e.g., WebTV or similar technology for obtaining Internet content, a recorder IDD 100*d*, e.g., a digital video recorder or a RePlay recorder, and a computer IDD 100*e*, i.e., a personal computer. All of the IDDs 100*a*–100*e* are operatively connected to one another via the IHDN 200. It will be appreciated that the information IDD 100*c* can be connected to the Internet (400) via a plain old telephone system (POTS) 300, so that data can be gathered from various data sources, e.g., 402A–402C.

It should be noted that several of the IDDs, e.g., entertainment IDD 100*b* and information IDD 100*c* advantageously can be combined in a single IDD 100*x*, although these IDDs are shown separately in FIG. 3. It should also be noted that the notation IDD is employed throughout to denote the wide scope of the present invention. For example, a nourishment IDD 100*f*, e.g., a microwave oven, and a speaker system IDD 100*g* advantageously can be connected to and form part of the entertainment and information system 1 according to the present invention without departing from the spirit and scope of the invention. Moreover, it will be appreciated that the interconnection of multiple IDD's 100 via the IHDN 200 represents only a single preferred embodiment according to the present invention. The IDD's 100 advantageously can be interconnected via the internet, a wireless network, a local area network, a wide area network or a virtual private network.

Figure 6:
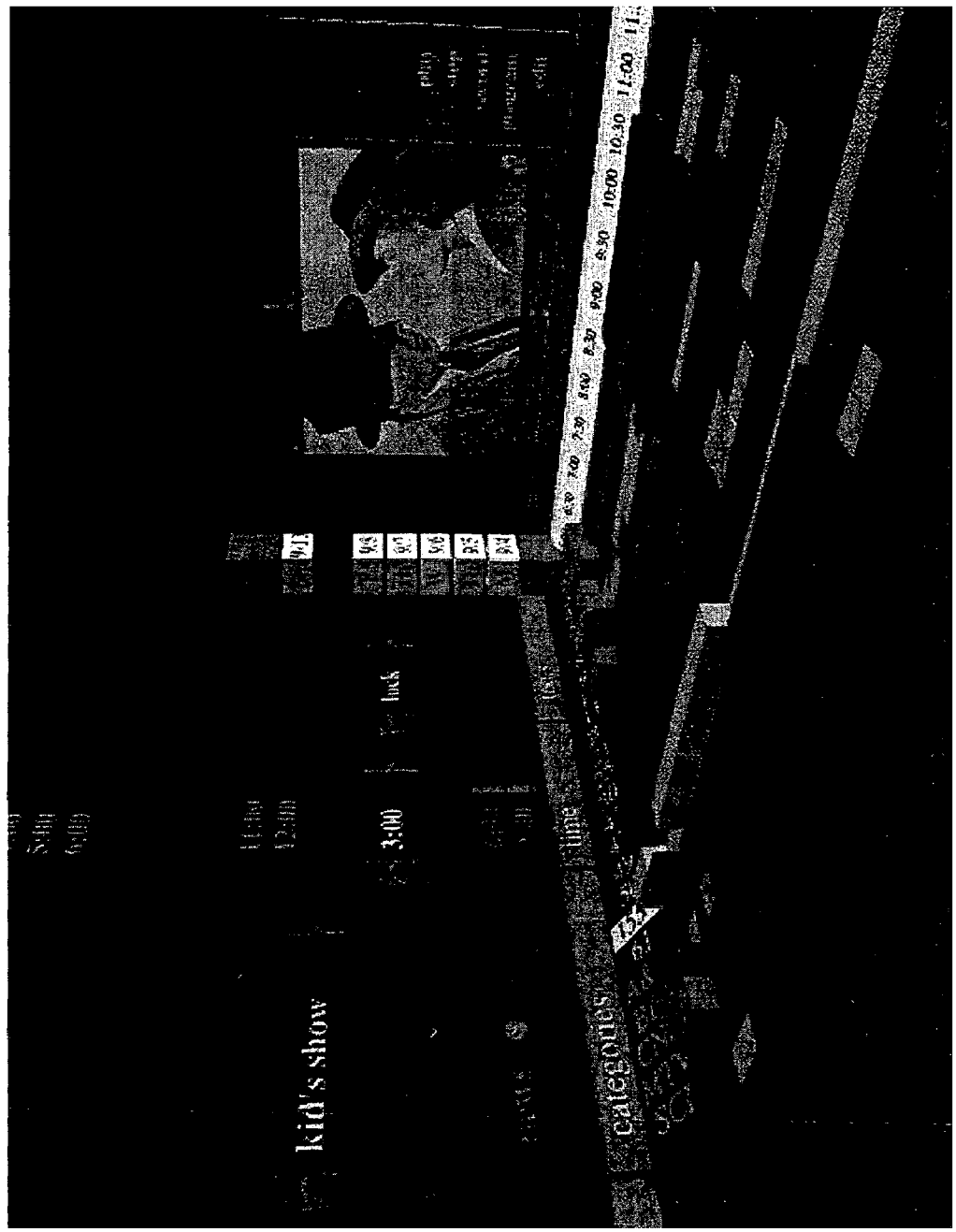
FIG. 6 is the output VRML 3D output produced for a sample data set of the EPG data in a particular embodiment of the invention.

In the exemplary preferred embodiment of the invention illustrated in FIG. 3, the entertainment IDD 100*b*, e.g., the STB, receives raw Electronic Program Guide (EPG) data sent by the broadcaster or cable operator as part of the Program and System Information Protocol (PSIP) standard. See FIG. 9. The EPG data is saved in a database stored in memory 120*b* located in the IDD 100*b*. The processor 110*b* in the IDD 100*b* then constructs an XML document model out of the raw data, i.e., the EPG data retrieved from the database in memory 120*b*, and transmits the XML packaged EPG data (hereinafter XML(EPG) document) to the display IDD 100*a*. In the exemplary embodiment being discussed, the XML(EPG) document includes a reference to a Virtual Reality Modeling Language (VRML) DTD, as illustrated in FIG. 4; the exemplary VRML.DTD is illustrated in FIG. 5. As previously mentioned, the IDD 100*b* need not actually generate the VRML.DTD (although the IDD 100*b* could generate the applicable DTD when required). The XML (EPG) document (and the VRML.DTD) is (are) transmitted to the IDD 160*a*, where the XML(EPG) document is converted for display on display 160*a* via the VRML 3D encoder instantiated by processor 110*a*. A representative screen capture of the VRML output is illustrated in FIG. 6.

Figure 7:
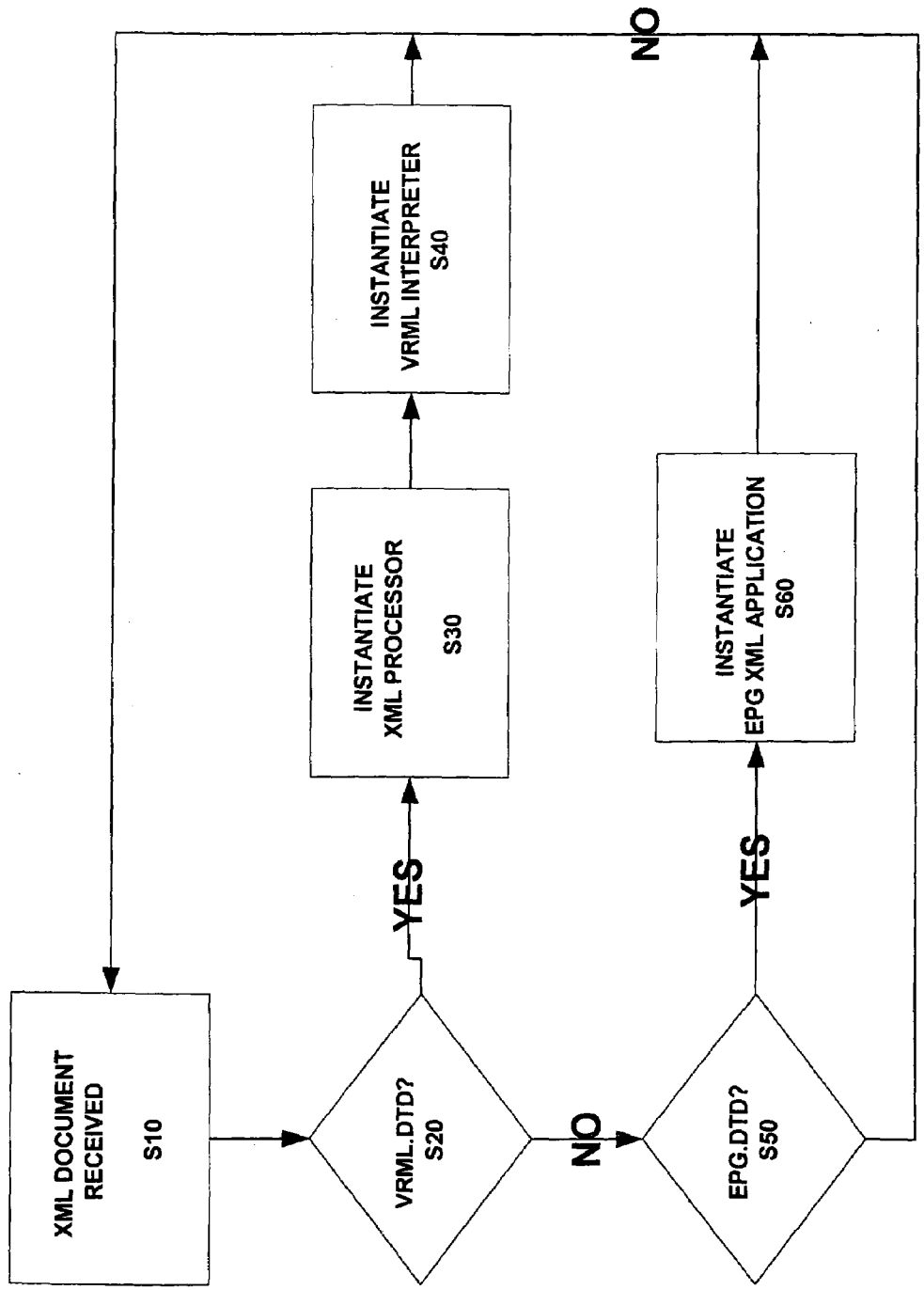
FIG. 7 is a high level flowchart illustrating an exemplary embodiment of the method of operating one of the IDDs upon receipt of the XML(EPG) document.

Referring now to FIG. 7, the method for operating the entertainment and information system 1 will now be explained in detail. More specifically, FIG. 7 is a high level flowchart of a method for operating the entertainment and information system 1 according to the first preferred embodiment of the present invention. During step S10, XML(EPG) document is received at IDD 100*a* from IDD 100*b* via IHDN 200. Then, during step S20, a check is performed to determine whether the XML(EPG) document references a trusted DTD, i.e., the VRML.DTD, which advantageously can be listed in LUT 128 of IDD 100*a*. It will be appreciated from FIGS. 2A and 2B that it is immaterial to the present discussion whether the trusted DTD referenced in the XML(EPG) document is transmitted via the IHDN 200 or stored in memory 120 of IDD 100*a*. When the answer is negative, the operating program of the IDD 100*a* jumps to step S50 and performs a check to determine whether the XML(EPG) document references an EPG.DTD.

If the answer at step S20 is affirmative, the processor 110 instantiates the XML processor stored in memory 120 during step S30 and instantiates the VRML interpreter stored in memory 120 during step S40. The XML processor parses the EPG data in the XML(EPG) document and outputs selected portions of the EPG data to the VRML interpreter, which, in turn, interprets the parsed EPG data and generates VRML data, as illustrated in FIG. 8, representing a three dimensional (3D) VRML "world" projected on the screen of the IDD 100*a*. See FIG. 6, which, as previously mentioned, is a screen capture of a VRML world depicting selected portions of the EPG data, as discussed in greater detail below.

When the answer is affirmative at step S50, the processor 110 instantiates an XML application during step S60, which parses the EPG data in the XML(EPG) document and outputs selected portions of the EPG data to the screen of the IDD 100*a* as EPG data in a grid form. When the answer is negative at step S50, the routine loops back to the start (step S10) to await the arrival of the next XML document.

Similarly, the IDD 100*c*, e.g., the WebTV unit or similar component, advantageously can receive Web content in XML or convert HTML into XML/DOM (Document Object Model). The IDD 100*c* can transmit the XML(HTML) document to the IDD 100*a* for display. Likewise, the recorder IDD 100*d*, e.g., a video recorder, also connected to other devices via the IHDN 200, transmits its table of contents (TOC) in XML format, i.e., transmits an XML (TOC) document to the IDD 100*a* for conversion to VRML for display. Thus, the IDD 100*a*, which advantageously includes an XML parser and a VRML decoder (interpreter and 3D pipeline), can interact with any other IDD to display data received in XML format.

It will be appreciated that the present invention is not limited to the exemplary embodiment described above. For example, it will be appreciated that IDD 100*a* advantageously can display 3D data representing the output of a plurality of data sources, e.g., IDDs 100*b*–100*d*, so that the user(s) can view and information residing on or obtainable via the entertainment and information system 1. Moreover, it will be appreciated that since the reference to a trusted DTD can be the trigger which initiates the operation of an XML processor or XML application, receipt of two such XML documents or DTDs advantageously can signal the initiation of a third XML application. In an exemplary case, when the XML(EPG) and XML(TOC) documents are both received by the IDD 100*a*, an exemplary XML application called SORT can be instantiated to examine the XML(EPG) document corresponding to the displayed VRML world for coincidences and/or discontinuities. In an illustrative case, the SORT XML application could be employed to determine that a particular program was marked as being of interest to the user but has not been designated for recording by recorder IDD 100*d*. It will be appreciated that an updated TOC for the IDD 100*d* advantageously could be transmitted from the IDD 100*a* to the IDD 100*d* as a second XML(TOC) document.

In order to better understand the IHDN described in this particular embodiment of the invention, a more detailed discussion regarding the movement of Electronic Program Guide (EPG) data from IDD to IDD will be presented. It will be appreciated that EPG applications will be more prevalent both as DTV becomes more prevalent and as the number of channels available to the user continues to grow. It will be appreciated that current two dimensional (2D) method of formatting data for display to the user do not scale up to the eventual 500+ channels predicted for DTV.

The EPG-VRML application discussed above is a three dimensional (3D) representation of the programs available in a graphic format similar to the layout appearing in most U.S. newspapers. The advantage of this representation over the 2D representation is that the 3D representation is scalable, i.e., the 3D display advantageously can accommodate the large numbers of channels that will be available to consumer in the near future. As mentioned above, the application was developed using VRML to display the EPG.

It should be mentioned that the EPG data is a structured data set which is very large. Advantageously, XML is designed to work with structured data and can handle arbitrarily large documents. Moreover, the EPG data is composed of text based information; XML works with text based documents. It will be appreciated that XML documents can reference files containing non-textual data, i.e., images, sounds, etc.

The XML EPG document must capture all of the information necessary to display both a concise listing of the programming available and a more verbose descriptive listing of the programs available. A Document Type Definition (DTD), as documented in XML literature, describes the data to be included in the XML(EPG) document. This DTD is depicted in FIG. 5. It will be noted that the VRML.DTD indicates the name of the processing application which advantageously can be used to further manipulate the EPG data, as discussed in greater detail below.

It will be noted that the DTD describes how all of the individual data elements associated with each television program are composed and related to each other. The DTD also describes how all of the television programs are grouped together to create an XML(EPG) document that captures all of the available programming on all of the available channels for some predetermined time period. Preferably, the XML(EPG) document must contain specific information about each program available to be useful to a user. The EPG document must, at a minimum contain the name of each available television program, the start time, the end time, and the channel for every television program. Additionally, each television program in the XML(EPG) document has a broad category label, indicating the type of program, i.e., comedy, musical, etc. A description of each television program would also be useful to the user, and as such is included in the XML(EPG) document and the associated DTD. As a possible extension, additional category specific information can also be included with the television program. For example, a movie listed in the EPG data advantageously can indicate the name of the director while a sporting event would indicate the type of sport being played and names of the players or teams playing.

As mentioned above, one partial example of the XML (EPG) document is depicted in FIG. 4. It should be noted from FIG. 4 that the name of the channel associated which this television program may not be needed by the EPG. In that case, the channel identification will simply be discarded when the IDD 100*a* parses the XML(EPG) document and displays the 3D representation of the EPG data to the user.

It will be appreciated that the data representation in XML is highly scalable. Any number of programs on any number of channels can be added to the XML document and transmitted to the EPG application via entertainment IDD 100*b*, IHDN 200, and display IDD 100*a*, which would cooperatively take the EPG data, parse it, and display the 3D representation of the EPG data, i.e., the VRML world, for the user. XML can therefore be used as the data transmission facilitator, even as the number of channels and programs increases over time.

Once the XML(EPG) document is received by the XML processor and VRML interpreter instantiated by processor 110*a*, the document is processed and displayed. For this application, the EPG data within the XML(EPG) document is converted to VRML data by the VRML interpreter and displayed for the user to browse and navigate. The parsing of the EPG data in the XML(EPG) document and the conversion of the parser's output to VRML format is performed by the XML processor and VRML encoder running on processor 110*a*. It is important to note that, because the EPG data is encoded in XML, a different XML application corresponding to a different method of displaying the EPG data could be substituted for this application (See FIG. 7.) without requiring any changes to the XML(EPG) document or the transmission mechanism, with the possible exception of modifying the DTD name in the XML(EPG) document. In short, an XML application is simply a consumer of the XML(EPG) document and does not need to know anything about the origins of the XML(EPG) document or how this document was delivered to the XML application. The originator of the EPG data in the XML(EPG) document could also be replaced without affecting the display of EPG data in any meaningful way.

It will be appreciated that parsing the XML(EPG) document entails walking through the XML document and collecting up all the relevant information, in an exemplary case, about each of the programs in the XML document. This information must then be translated into a useful VRML representation of the data, which is a relatively straightforward transform understood by one of ordinary skill in the art. A selected portion of the VRML program data is shown in FIG. 6; a selected portion of the VRML commands is depicted in FIG. 8.

The EPG VRML program data is used by the EPG application to display all of the programs in the VRML visual display to the user. This allows the data to change, but keep the same visual VRML representation.

Figure 9:
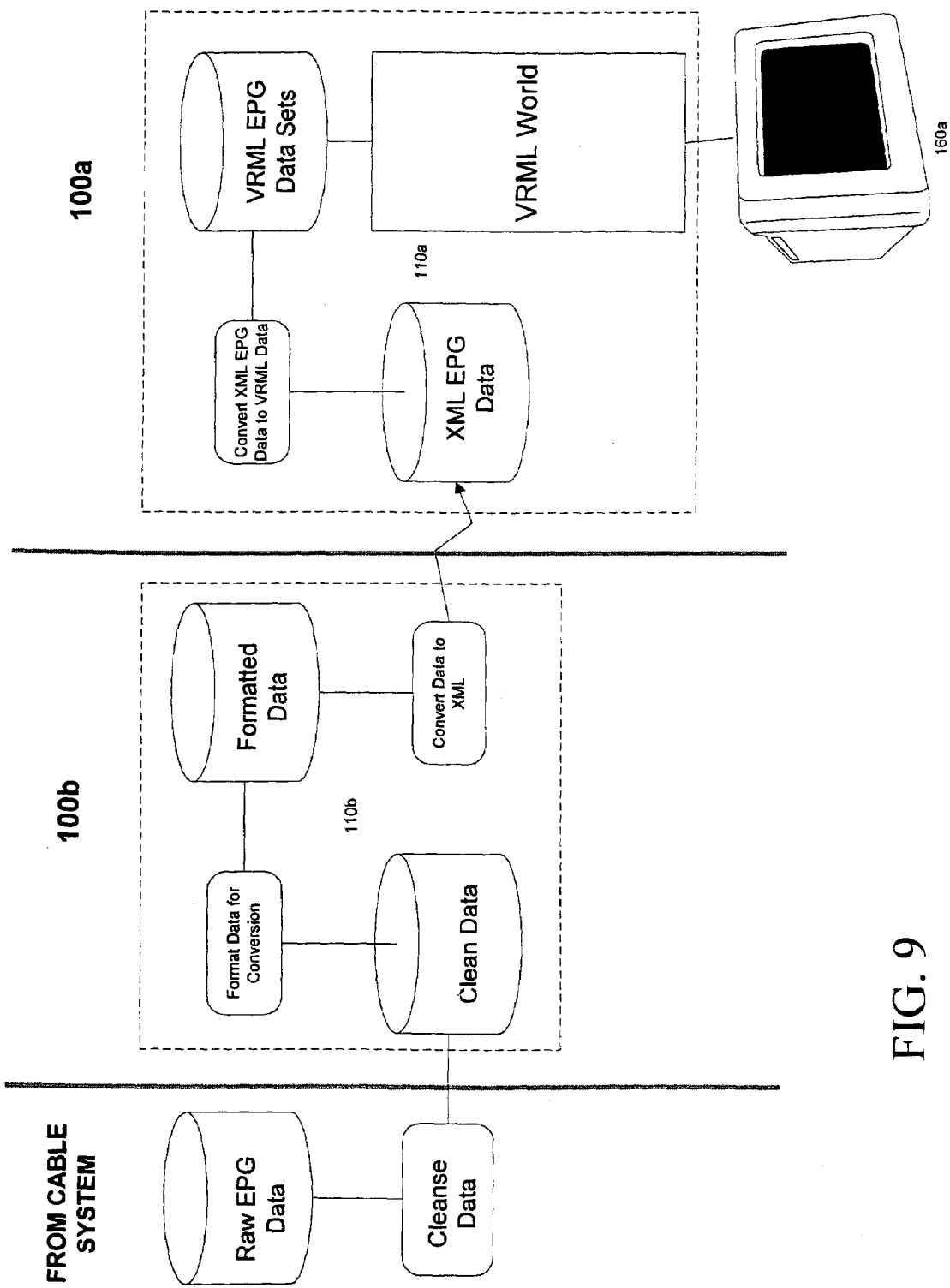
FIG. 9 is a representational diagram of the multilevel process by which EPG data is converted to a 3D EPG display.

A functional diagram depicting the entire process, from receiving EPG data at IDD 100*b* to displaying the 3D visualization of the EPG data on display IDD 100*a* application, including an exemplary data transformation, transmission, and display sequence is illustrated in FIG. 9. In FIG. 9, it is assumed the raw EPG data is not saved in XML format and must be converted to XML by IDD 100*b*. Before the data is converted to XML, it is cleansed of any erroneous or unnecessary data points and saved in memory 120*b* of IDD 100*b*. The cleansed data can then be formatted into a structure that makes conversion into XML easier. It will be appreciated that this may involve ordering the data in a consistent way and collecting related data records together. Once this step has been completed, the data is converted to and XML representation, based on the selected DTD for EPG data, by processor 110*b*.

The XML(EPG) document is then transmitted to the display IDD 100*a* for display. Once received by the IDD 100*a*, the XML(EPG) document is parsed and converted into the format necessary for display, using the referenced DTD. See FIG. 7. In the exemplary case under discussion, the XML processor parses the XML(EPG) document and generates data suitable for application to the VRML interpreter, which generates the VRML data corresponding to the EPG data. This VRML code is then combined with the VRML code that describes the 3D VRML world structure. Once this step is completed, a VRML world containing a 3D representation of current EPG data is ready for display on IDD 100*a*.

It will be appreciated from FIG. 7 that the VRML world has many features to aid the user in navigating the EPG data in a useful manner. The user can visually highlight categories of programs, programs within specific time periods, or some combination of the two. The user may also select channels of interest and move up and down through the vast selection of available channels. It is also possible to display a preview of some of the programs on the preview screen above the EPG program listings. It will be noted that the day tower at the nexus of the channel axis and time axis is used to change the day being viewed.

It should be noted again that all of the documents, articles and papers cited above are incorporated herein by reference. Moreover, is should again be stressed that while the mechanism by which the various IDD's are interconnected is described as an IHDN with respect to one preferred embodiment, the present invention is not limited to IDD's interconnected in this manner. The IDD's can also be interconnected via the internet, a virtual private network, a wireless network, a local area network, or a private wide area network without departing from the scope of the present invention.

Finally, it should be noted that many of the tools currently available for working with XML can be obtained for free. Many are simple experiments by individuals interested in exploring this new domain, some are beta versions of tools that companies plan on selling at some point in the future, and other tools are released by companies as freeware in the hopes that it will spur the movement of development efforts on the Internet towards XML and other products sold by these companies.

Although a presently preferred embodiment of the present invention has been described in detail hereinabove, it should be clearly understood that many variations and/or modifications of the basic inventive concepts herein taught, which may appear to those skilled in the pertinent art, will still fall within the spirit and scope of the present invention, as defined in the appended claims.

What is claimed is:

1. A method of operating an intelligent digital device (IDD) receiving an extensible Markup Language (XML) document containing data and respective Document Type Definition (DTD) describing content of said data, comprising:

verifying that a received DTD satisfies a predetermined criterion; and, if said criterion is satisfied, operating on said data based on said content, wherein the IDD maintains a list of trusted DTDs, and wherein the predetermined criterion is equality between the name of the received DTD and the name of a trusted DTD.

2. The method as recited in claim 1, wherein the predetermined criterion comprises the inclusion of the name of a program residing on the IDD.

3. The method as recited in claim 2, wherein the program comprises an XML-enabled program.

4. The method as recited in claim 2, wherein the program comprises an XML parser.

5. The method of claim 1, wherein said received DTD is contained along with said data in said XML document upon reception of said DTD that is to be subject to said verifying.

6. The method of claim 5, wherein said verifying is performed in response to said reception.

7. A method of operating a system including a digital network interconnected intelligent digital devices (IDDs) generating and receiving eXtensible Markup Language (XML) documents containing data and respective Document Type Definitions (DTDs) describing content of said data, comprising:

transmitting a generated XML document from a first IDD to a second IDD; and when the respective DTD for the generated XML document satisfies a predetermined criterion, operating on said data contained in the XML document at the second IDD based on said content, wherein the second IDD maintains a list of trusted DTDs, and wherein the predetermined criterion is equality between the name of the respective DTD and the name of a trusted DTD.

8. The method as recited in claim 7, wherein the predetermined criterion comprises the inclusion of the name of a program residing on the second IDD.

9. The method as recited in claim 8, wherein the program comprises an XML-enabled program.

10. The method as recited in claim 8, wherein the program comprises an XML processor.

11. The method as recited in claim 7, wherein:

the transmitting step comprises transmitting the generated XML document from the first IDD to the second IDD and a third IDD;

the operating step comprises operating on the data contained in the XML document at the second IDD when the respective DTD for the generated XML document satisfies a first predetermined criterion, and the method further comprises the step of operating on the data contained in the XML document at the third IDD when the respective DTD for the generated XML document satisfies a second predetermined criterion.

12. The method as recited in claim 11, wherein:

the second IDD maintains a first list of trusted DTDs;

the third IDD maintains a second list of trusted DTDs;

the first predetermined criterion is equality between the name of the respective DTD and the name of a trusted DTD on the first list; and the second predetermined criterion is equality between the name of the respective DTD and the name of a trusted DTD on the second list.

13. The method as recited in claim 11, wherein the XML document and the respective DTD are transmitted to the second and third IDDs.

14. The method as recited in claim 11, wherein the respective DTD is stored on at least one of the second and third IDDs.

15. The method of claim 7, comprising the steps of:
receiving the transmitted, generated XML document;
determining, upon reception of said transmitted, generated XML document, whether said criterion is satisfied; and
if said determining determines that said criterion is satisfied, performing said operating.

16. A method of operating a system including a digital network of interconnected intelligent digital devices (IDDs) generating and receiving eXtensible Markup Language (XML) documents containing information and respective Document Type Definitions (DTDs), the DTDs respectively describing content of said information, comprising the steps of:
(a) generating an XML document containing data and a reference to a respective DTD at a first IDD responsive to a command from a second IDD;
(b) transmitting the XML document from the first to the second IDD;
(c) when said respective DTD satisfies a predetermined criterion, parsing said data in accordance with a format described in said respective DTD to thereby generate parsed data; and
(d) operating on the parsed data, wherein:
the second IDD stores a list of trusted DTDs associated with respective XML processors;
the predetermined criterion is coincidence between the respective DTD and a trusted DTD on the list; and
the parsing and the operating steps are performed using the one of the XML processors corresponding to the respective DTD.

17. The method as recited in claim 16 wherein:
the second IDD stores a plurality of DTDs and associated XML processors;
the XML document references the respective DTD; and
the parsing and the operating steps are performed using the one of the XML processors corresponding to the respective DTD.

18. A system comprising:
a plurality of intelligent digital devices (IDDs) interconnected to one another, each of the IDDs being capable of one of generating and receiving an eXtensible Markup Language (XML) document containing data and referencing a document type definition (DTD); wherein:
a first IDD generates the XML document responsive to a command received over an in-house digital network (IHDN);
a second IDD stores N XML processors associated with N named DTDs;
a third IDD stores M XML processors associated with M named DTDs;
the second IDD processes the XML document using one of the N XML processors when the respective DTD corresponds to one of the N named DTDs;
the third IDD processes the XML document using one of the M XML processors when the respective DTD corresponds to one of the M named DTDs; and
N and M are both positive integers.

19. The system as recited in claim 18, wherein at least one of the N named DTDs and at least one of the M named DTDs are identical to the respective DTD, and wherein the one of the N XML processors corresponding to the respective DTD is different than the one of the M XML processors corresponding to the respective DTD.

20. The system as recited in claim 18, wherein the second IDD stores the N named DTDs, and wherein the third IDD stores the M named DTDs.

21. The system as recited in claim 18, wherein the second and third IDDs store lists of trusted DTDs including the associated N and M named DTDs, and wherein the first IDD generates the XML document and the respective DTD responsive to the command received over the IHDN.

22. The system as recited in claim 18, wherein said IDDs are interconnected to one another by an in home digital network (IHDN).

23. The system as recited in claim 18, wherein said IDDs are interconnected to one another via the internet.

24. An intelligent digital device (IDD) for receiving an eXtensible Markup Language (XML) document containing data and a respective Document Type Definition (DTD) describing content of said data, said IDD comprising:
means for verifying that a received DTD satisfies a predetermined criterion; and,
means for, if said criterion is satisfied, operating on said data based on said content, wherein the IDD maintains a list of trusted DTDs, and wherein the predetermined criterion is equality between the name of the received DTD and the name of a trusted DTD.

25. A digital network of interconnected intelligent digital devices (IDDs) generating and receiving eXtensible Markup Language (XML) documents containing data and respective Document Type Definitions (DTDs) describing content of said data, said network comprising:
first and second IDDs;
means for transmitting a generated XML document from the first IDD to the second IDD; and
means for, when the respective DTD for the generated XML document satisfies a predetermined criterion, operating on said data contained in the XML document at the second IDD based on said content, wherein the IDD maintains a list of trusted DTDs, and wherein the predetermined criterion is equality between the name of the received DTD and the name of a trusted DTD.

26. An article of manufacture comprising a computer-readable medium in which is stored a computer program for operating an intelligent digital device (IDD) for receiving an eXtensible Markup Language (XML) document containing data and a respective Document Type Definition (DTD) describing content of said data, said program comprising:
instructions for verifying that a received DTD satisfies a predetermined criterion; and,
instructions for, if said criterion is satisfied, operating on said data based on said content, wherein the IDD maintains a list of trusted DTDs, and wherein the predetermined criterion is equality between the name of the received DTD and the name of a trusted DTD.

* * * * *